United States Patent [19]

McDonnell et al.

[11] Patent Number: 4,869,772

[45] Date of Patent: Sep. 26, 1989

[54] DIAZABICYCLO AND TRIAZABICYCLO PRIMER COMPOSITIONS AND USE THEREOF IN BONDING NON-POLAR SUBSTRATES

[75] Inventors: Patrick F. McDonnell; Brendan J. Kneafsey, both of Dublin, Ireland

[73] Assignee: Loctite (Ireland) Ltd., Tallaght, Ireland

[21] Appl. No.: 206,587

[22] Filed: Jun. 14, 1988

[30] Foreign Application Priority Data

Jun. 19, 1987 [IE] Ireland ................................. 1637/87

[51] Int. Cl.⁴ .............................................. C09J 5/04
[52] U.S. Cl. .................................. 156/314; 106/287.2; 106/287.21; 156/331.2; 427/412.1; 427/412.3; 540/473; 540/567; 544/279; 544/282
[58] Field of Search .......................... 156/314, 331.2; 106/287.2, 287.21; 427/412.1, 412.3; 544/279, 282; 540/473, 567

[56] References Cited

U.S. PATENT DOCUMENTS

| | | | |
|---|---|---|---|
| 3,260,637 | 7/1966 | Bramer | 156/314 |
| 3,761,436 | 9/1973 | Hashimoto et al. | 540/567 |
| 4,595,445 | 6/1986 | Hombach et al. | 156/307.3 |

FOREIGN PATENT DOCUMENTS

| | | | |
|---|---|---|---|
| 0220555 | 5/1987 | European Pat. Off. | |
| 43-5004 | 2/1968 | Japan | 156/314 |
| 12094 | 3/1974 | Japan | |
| 176352 | 10/1982 | Japan | |
| 157940 | 7/1985 | Japan | |

*Primary Examiner*—John J. Gallagher

*Attorney, Agent, or Firm*—Edward K. Welch, II; Eugene F. Miller

[57] ABSTRACT

In a process for priming a non-polar substrate such as a polyolefin for bonding with a cyanoacrylate adhesive, the use of an adhesion-promoting primer comprising at least one diazabicyclo or triazabicyclo compound selected from 1,5-diazabicyclo[4.3.0]non-5-ene having the formula:

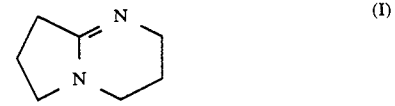

(I)

1,8-diazabicyclo[5.4.0]undec-7-ene having the formula:

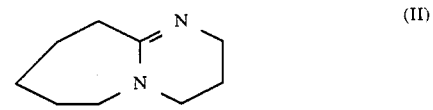

(II)

and 1,5,7-triazabicyclo[4.4.0]dec-5-ene having the formula:

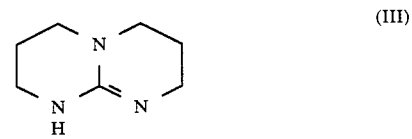

(III)

The primer also contains a solvent.

20 Claims, No Drawings

DIAZABICYCLO AND TRIAZABICYCLO PRIMER COMPOSITIONS AND USE THEREOF IN BONDING NON-POLAR SUBSTRATES

BACKGROUND OF THE INVENTION (1) Field of the Invention

The present invention relates to use of a primer to promote the bonding of non-polar or highly crystalline substrates with adhesives, especially with cyanoacrylate adhesives. In particular, the primer of the present invention promotes bonding of polyolefins or similar plastic substrates with low surface energy.

Because of their low surface energy non-polar materials are difficult to bond, even with cyanoacrylate adhesives. These materials are represented by linear polymers of simple olefins, such as polyethylene, polypropylene, polybutene and the like, including their copolymers. Other materials which can be bonded by this invention are substrates having low surface energy such as polyacetals, plasticized PVC (polyvinyl chloride), polyurethane, EPDM (ethylene-propylene diamine monomer) rubber, thermoplastic rubbers based on vulcanized polyolefins and the like.

The materials bonded by this invention have, in general, a waxy, paraffin-like surface character, with a low critical surface tension of wetting and may have at their surface a weak boundary layer. In general, there is an absence of polar groups which are necessary to raise the surface energy to the level needed to give adhesion with conventional adhesives.

(2) Description of the Prior Art

Various surface treatments have been used heretofore to improve adhesion of the difficult-to-bond materials described above. These treatments include surface abrasion, corona discharge (J. C. Von der Heide & H. L. Wilson, Modern Plastics 38 9 (1961) p 199), flame treatment (E. F. Buchel, British Plastics 37 (1964) p 142), U.V. radiation (Practising Polymer Surface Chemistry, D. Dwight, Chemtech (March 1982) p 166), plasma treatment, hot chlorinated solvents, dichromate/sulphuric acid and chlorine/U.V. radiation (D. Brewis & D. Briggs, Polymer 22 7 (1981) and references therein). All the above treatments are effective to some degree and are generally thought to work by introducing polar groups on non-polar substrates.

While the above treatments may, on occasion, improve the ability of difficult substrates to be bonded with adhesives, the treatments have the disadvantage of requiring specialized apparatus and equipment and can involve corrosive and/or hazardous materials.

Apart from the above treatments, there are examples in the prior art of the use of various accelerators or initiators of the polymerization of the cyanoacrylate monomer. The disadvantage with such accelerators or initiators is that while the speed of cure of the bond is increased, adhesion on non-polar substrates is not promoted and the resulting bond can be very weak and the adhesive can slip off the substrate.

An accelerator comprising a solution of certain amines and a deodorant is disclosed in Japanese patent application No. 599066471-A. U.S. Pat. No. 3 260 637 of Von Bramer discloses the use of various classes of organic amines (but specifically excludes primary amines) as accelerators in conjunction with cyanoacrylate adhesives. The compositions of both of these specifications can best be described as accelerators or initiators of the polymerization of cyanoacrylate monomer without improving adhesion on non-polar substrates.

Various primers also have been proposed to promote adhesion. For example, Japanese patent application Nos. 52-98062, 56-141328 and 57-119929 suggest the use of primers prepared by dissolving a chlorinated polyethylene or chlorinated polypropylene or a fatty acid-modified acrylated alkyd resin in an organic acid. In general, however, organic acids tend to inhibit or prevent curing of cyanoacrylate adhesives. The primer of the present invention has the advantage of using a low molecular weight material which is readily soluble in common solvents.

European specification No. 0 129 069 A2 discloses the use of a primer comprising at least one organometallic compound, for use with alphacyanoacrylate adhesives, which is useful in bonding non-polar substrates. Japanese application No. 61023630 proposes organometallic primers for joining plastic models. Both of these documents disclose the use of organo-metallic compounds which are potentially highly toxic materials.

Primers for polyolefins comprising (i) modified or grafted polyolefins such as chlorinated polyolefins, ethylene/vinyl copolymer or ethylene/propylene terpolymer, (ii) a crosslinkable binder and (iii) crosslinking agents, are disclosed in European application No. 187171A. The primer described there is somewhat inconvenient to use and apply due to its rubbery consistency, and heating may be needed to activate the primer on the substrate. In addition the solvents used (e.g. toluene and 1,1,1-trichloroethylene) have an undesirable toxicity.

German application No. DE 3601518-A suggests the use of primers for polyolefins comprising an organometallic compound and an organic polymer; the organometallic compound being a metal alcoholate and the term "metal" including metalloids, phosphorous, boron or silicon atoms. The materials disclosed such as dibutyltin diacetate and other organo-metallic compounds are highly toxic for use as primers.

Japanese application No. 61136567 describes a titanate primer for bonding polypropylene. The titanate primers give little or no improvement when bonding difficult materials, such as polyethylene, to itself or to other materials, when cyanoacrylate adhesives are employed.

Japanese application No. 60157940 discloses a primer composition based on a solution of 4-vinyl pyridine as an essential ingredient, and 3,4-lutidine as an optional ingredient, for bonding polyolefins, polyacetal, polyamide, polyester, boron-polymer, silicone or PVC. However, the disadvantage with the primer of Japanese application No. 60157940 is that it has a strong odour and, in addition, it does not produce as strong a bond as that produced by the primer of the present invention.

Object of the Invention

It is an object of this invention to provide a primer which is useful in bonding non-polar plastics to themselves, or to other substrates, using adhesives, especially cyanoacrylate adhesives.

Summary of the Invention

In a process for priming a non-polar substrate for bonding with an adhesive, the present invention comprises use of an adhesion-promoting primer comprising at least one diazabicyclo or triazabicyclo compound selected from 1,5-diazabicyclo[4.3.0]non-5-ene having the formula:

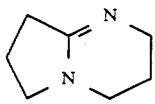

(I)

1,8-diazabicyclo[5.4.0]undec-7-ene having the formula:

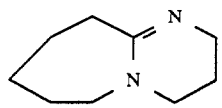

(II)

and 1,5,7-triazabicyclo[4.4.0]dec-5-ene having the formula:

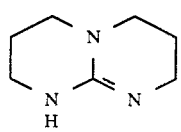

(III)

Preferably the primer also comprises an organic solvent in which the azabicyclo compound is stable, such as acetone, methyl ethyl ketone, 1,1,1-trichloroethane, methanol, 1,1,2-trichloro-1,2,2,-trifluoroethane or mixtures thereof with each other or with other solvennts such as an azeotropic mixture of 1,1,2-trichloro-1,2,2,-triflourethane with acetone. The function of the solvent is to provide a suitable concentration of the azabicyclo compound so that a coating of selected thickness can be applied to a surface. Therefore, any common solvent in which the compound is stable will suffice.

While it is well known that solutions of amines and other organic and inorganic bases will accelerate the cure iof cyanoacrylate adhesives, it is surprising that thee primers of this invention also confer adhesion on non-polar substrates. The curing or polymerisation of a film of cyanoacrylate, between two materials, does not necessarily result in a strong bond, particularly if the materials are non-polar, and if the polymerisation of the cyanoacrylate is excessively rapid, a very weak bond or no bond will result.

The primer composed of one of the above diazabicyclo or triazabicyclo compounds as a solution in a solvent is normally of such concentration that the thickness of the coating can be controlled to achieve the full effects of this invention.

It is preferable that a solution of the diazabicyclo or triazabicyclo compound in the solvent should have a concentration of 0.001–30% weight/volume. Preferred concentrations are 0.01–2% weight/volume.

The invention also provides a 2-part adhesive system comprising (i) an alpha-cyanoacrylate adhesive and (ii) a primer as defined above.

Suitable cyanoacrylate adhesives for use with the primer of this invention are represented by the general formula

(IV)

wherein $R^1$ is alkyl, alkenyl, cycloalkyl, aryl, alkoxyalkyl, aralkyl, haloalkyl or another suitable group. The lower alkyl alpha-cyanoacrylates are preferred, and in particular methyl, ethyl, n-propyl, n-butyl, isobutyl, isopropyl, allyl, cyclohexyl, methoxyethyl or ethoxyethyl cyanoacrylates are preferred.

Many alpha-cyanoacrylates can be obtained commercially as one component instant adhesives, in which form they may be used in this invention.

While these commercially cyanoacrylates are composed principally of alpha-cyanoacrylate monomer, the formulation may contain stabilizers, thickeners, adhesion promoters, plasticizers, dyes, heat resistant additives, impact resistance modifiers, perfumes and such like.

A diluted solution of a cyanoacrylate adhesive in a compatible solvent may also be used.

In a further aspect the invention provides a method of bonding a non-polar substrate to another substrate which may be polar or non-polar, which comprises treating the non-polar substrate(s) with a primer as defined above and then applying an alpha-cyanoacrylate adhesive to the substrate(s).

In the case where the substrates to be bonded are both non-polar or otherwise difficult-to-bond materials of that type, both substrates are coated with a solution of primer. This coating may suitably be applied by brush, spray or immersion of the substrate in the primer solution. If the non-polar substrate is to be bonded to a polar or more active substrate, only the non-polar substrate needs to be coated with the primer.

Following application of the primer to the non-polar substrate(s), the bond is completed using cyanoacrylate adhesive in the normal manner.

Bonding tests were carried out using various substrates, including natural polyethylene and natural polypropylene as the non-polar substrates, various solutions of the diazabicyclo compounds as the primer and various grades of cyanoacrylate adhesive commercially available from Loctite (Ireland) Limited, Dublin, Ireland. The bond strength of the resulting joints was determined using conventional methods, such as a tensile testing machine.

DESCRIPTION OF THE PREFERRED EMBODIMENTS

The following examples will more clearly illustrate the invention.

EXAMPLE 1

0.50 g of 1,8-diazabicyclo[5.4.0]undec-7-ene was dissolved in 99.5 cc of Freon TA [trade mark for azeotrope of acetone and 1,1,2-trichloro-1,2,2-trifluoroethane, available from E.I. Du Pont de Nemours & Co. Inc.] to form a primer solution.

Test pieces of natural polyethylene of dimensions 100 mm×25 mm and 3 mm in thickness were carefully deburred and degreased with acetone. The above primer solution was applied to the test pieces by brush to form a single coating. This coating was allowed to dry (a) 2 minutes; and (b) 5 minutes in air under unforced conditions. Two polyethylene test pieces, both of which were primer coated as above, were then bonded with Loctite 406 [a cyanoacrylate adhesive manufactured by Loctite Corporation, Newington, CT., U.S.A.]. The overlap bond area was 1.61 cm². The bonds were clamped with a force of 4.0 kg/cm² for 24 hours at a temperature of 22° C.

Test pieces of natural polypropylene of dimensions 100 mm×25 mm×3 mm were also prepared and coated with a primer solution as described above and bonded with Loctite 406 adhesive as in the above procedure.

The tensile shear bond strength was then determined on an Instron testing machine at a pulling rate of 200 mm/minute according to Test Method ASTM D1002.

As a control, the above procedure was repeated except that no primer coating was applied to the test pieces.

The results are shown in Table 1.

TABLE 1
TENSILE SHEAR BOND STRENGTHS ON POLYETHYLENE AND POLYPROPYLENE
[Primer Based on 1,8-diazabicyclo (5.4.0) undec-7-ene]

| | | | Tensile Shear Bond Strength (Kg/cm$^2$) | |
|---|---|---|---|---|
| Coating | Drying Time | Run No. | Polyethylene/ Polyethylene | Polypropylene/ Polypropylene |
| Primer | 2 minutes | 1 | 58 | 66 |
| " | " | 2 | 53 | 67 |
| " | " | 3 | 65 | 37 |
| " | 5 minutes | 1 | 47 | 74 |
| " | " | 2 | 57 | 62 |
| " | " | 3 | 37 | 38 |
| Control (No Primer) | | 1 | 0 | 8 |
| | | 2 | 0 | 9 |
| | | 3 | 0 | 7 |

[Adhesive used above was Loctite 406 which is based on ethyl-2-cyanoacrylate.]

EXAMPLE 2

Primer solutions were prepared by dissolving 0.50 g each of 1,5-diazabicyclo[4.3.0]non-5-ene, 1,8-diazabicyclo[5.4.0]undec-7-ene and 1,5,7-triazabicyclo[4.4.0]dec-5-ene in 99.5 cc of Freon TA. Test pieces of natural polyethylene were prepared as in Example 1 and both surfaces to be bonded were treated with a single coating of one of the above primers. The coating was allowed to dry in air for 5 minutes. The primed test pieces were then bonded with Loctite 406 cyanoacrylate with the bonds being prepared, aged and tested as in Example 1.

Controls with no primer were also prepared.

The results are shown in Table 2.

TABLE 2
POLYETHYLENE BOND STRENGTHS WITH THE THREE PRIMERS

| Primer Type | Run No. | Tensile Shear Bond Strength (kg/cm$^2$) Polyethylene/Polyethylene |
|---|---|---|
| 1,5-diazabicyclo [4.3.0] -non-5-ene | 1 | 48 |
| | 2 | 48 |
| | 3 | 45 |
| 1,8-diazabicyclo [5.4.0] -undec-7-ene | 1 | 55 |
| | 2 | 68 |
| | 3 | 62 |
| 1,5,7-Triazabicyclo [4.4.0] dec-5-ene | 1 | 40 |
| | 2 | 33 |
| | 3 | 49 |
| Control (No Primer) | 1 | 0 |
| | 2 | 0 |
| | 3 | 0 |

EXAMPLE 3

The following primer solutions were prepared:

Primer A  1.0 g. of 1,8-diazabicyclo [5.4.0] undec-7-ene dissolved in 99.0 cc of Freon TA.
Primer B  0.10 g. of 1,8-diazabicyclo [5.4.0] undec-7-ene dissolved in 99.90 cc of Freon TA.
Primer C  0.050 g of 1,8-diazabicyclo [5.4.0] undec-7-ene dissolved in 99.95 cc of Freon TA.
Primer D  0.20 g of 1,5-diazabicyclo [4.3.0] non-5-ene dissolved in 99.80 cc of Freon TA
Primer E  0.25 g of 1,5,7-triazabicyclo [4.4.0] dec-5-ene dissolved in 100 cc of Freon TA
Primer F  0.05 g of 1,5,7-triazabicyclo [4.4.0] dec-5-ene dissolved in 100 cc of Freon TA.

Test pieces of natural polyethylene were prepared as in Example 1. These were treated with a single coating of one of the above primers and allowed to dry in air for 5 minutes. Primer was applied to both surfaces to be bonded. The primed test pieces (and unprimed controls) were bonded with Loctite 406 cyanoacrylate adhesive as in Example 1.

The results are shown in Table 3.

TABLE 3
PRIMER SOLUTIONS AT VARIOUS CONCENTRATIONS

| | Run No. | Tensile Shear Bond Strength (kg/cm$^2$) Polyethylene/Polyethylene |
|---|---|---|
| Primer A | 1 | 56 |
| | 2 | 60 |
| | 3 | 61 |
| Primer B | 1 | 62 |
| | 2 | 80 |
| | 3 | 87 |
| Primer C | 1 | 80 |
| | 2 | 77 |
| | 3 | 87 |
| Primer D | 1 | 45 |
| | 2 | 56 |
| | 3 | 48 |
| Primer E | 1 | 22 |
| | 2 | 29 |
| | 3 | 37 |
| Primer F | 1 | 26 |
| | 2 | 24 |
| | 3 | 25 |

EXAMPLE 4

The primer solution from Example 1 was used to coat test pieces of natural polyethylene which were prepared as in Example 1.

A single coating of the primer was applied to both surfaces to be bonded and allowed to dry in air under unforced conditions for various periods before completing the bond with Loctite 406 cyanoacrylate adhesive. The bonds were aged at 22° C. for 24 hours and tested as in Example 1. Test pieces with no primer coating were otherwise bonded and tested as above.

Details of drying times and test results (bond strengths) are in Table 4.

TABLE 4

| Drying Time Before Bonding | ON-PART LIFE Tensile Shear Bond Strength (kg/cm$^2$) Polyethylene/Polyethylene | | |
|---|---|---|---|
| | Run 1 | Run 2 | Run 3 |
| 30 seconds | 80 | 77 | 87 |
| 60 " | 67 | 72 | 67 |
| 120 " | 58 | 53 | 65 |
| 300 " | 56 | 60 | 61 |
| 600 " | 70 | 62 | 55 |
| 1,800 " | 52 | 38 | 58 |
| 3,600 " | 34 | 40 | 36 |
| 14,000 " | 34 | 30 | 29 |

Controls with no primer gave zero bond strength under above conditions.

We claim:

1. A method of bonding a non-polar substrate to another substrate which may be polar or non-polar, which comprises treating the non-polar substrate or substrates with an adhesion-promoting primer comprising at least one diazabicyclo or triazabicyclo compound selected from;

1,5-diazabicyclo[4.3.0]non-5-ene having the formula:

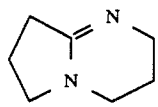
(I)

1,8-diazabicyclo[5.4.0]undec-7-ene having the formula:

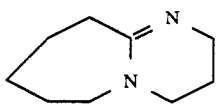
(II)

and 1,5,7-triazabicyclo[4.4.0]dec-5-ene having the formula:

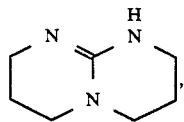
(III)

applying an alpha-cyanoacrylate adhesive to the substrate or substrates and then adjoining the two substrates.

2. The method of claim 1 wherein the primer also comprises an organic solvent in which the diazabicyclo or triazabicyclo compound is stable.

3. The method of claim 2 wherein the solvent is selected from acetone, methyl ethyl ketone, 1,1,1-trichloroethane, methanol, 1,1,2-trichloro-1,2,2-trifluoroethane and mixtures thereof with each other and with other solvents.

4. The method of claim 2 wherein the solution of at least one diazabicyclo or triazabicyclo compound in the solvent has a concentration of 0.001 to 30% weight/volume.

5. The method of claim 2 wherein the solution of at least one diazabicyclo or triazabicyclo compound in the solvent has a concentration of 0.01 to 2% weight/volume.

6. A method for priming a non-polar substrate for bonding with a cyanoacrylate adhesive comprising treating said substrate with an adhesion-promoting primer comprising at least one diazabicyclo or triazabicyclo compound selected from;

1,5-diazabicyclo[4.3.0]non-5-ene having the formula:

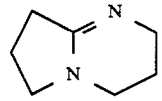
(I)

1,8-diazabicyclo[5.4.0]undec-7-ene having the formula:

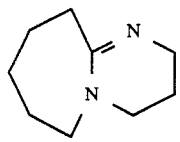
(II)

and 1,5,7-triazabicyclo[4.4.0]dec-5-ene having the formula:

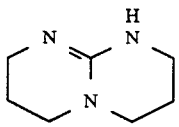
(III)

7. The method of claim 6 wherein the primer also comprises an organic solvent in which the diazabicyclo or triazabicyclo compound is stable.

8. The method of claim 7 wherein the solvent is selected from acetone, methyl ethyl ketone, 1,1,1-trichloroethane, methanol, 1,1,2-trichloro-1,2,2-trifluoroethane and mixtures thereof with each other and with other solvents.

9. The method of claim 8 wherein the solvent is an azeotropic mixture of 1,1,2-trichloro-1,2,2-trifluoroethane with acetone.

10. The method of claim 7 wherein the solution of the at least one diazabicyclo or triazabicyclo compound in the solvent has a concentration of 0.001 to 30% weight/volume.

11. The method of claim 7 wherein the solution of the at least one diazabicyclo or triazabicyclo compound in the solvent has a concentration of 0.01 to 2% weight/volume.

12. A two-part adhesive system comprising (i) an alpha-cyanoacrylate adhesive and (ii) a primer comprising at least one diazabicyclo or triazabicyclo compound selected from;

1,5-diazabicyclo[4.3.0]non-5-ene having the formula:

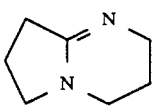
(I)

1,8-diazabicyclo[5.4.0]undec-7-ene having the formula:

1,8-diazabicyclo[5.4.0]undec-7-ene having the formula:

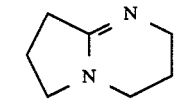
(I)

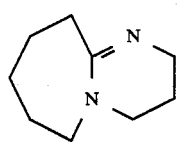
(II)

and 1,5,7-triazabicyclo[4.4.0]dec-5-ene having the formula:

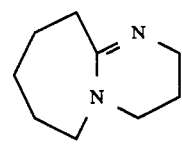
(II)

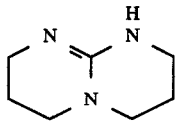
(III)

and 1,5,7-triazabicyclo[4.4.0]dec-5-ene having the formula:

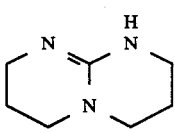
(III)

13. The two-part adhesive system of claim 12 wherein the primer also comprises an organic solvent in which the diazabicyclo or triazabicyclo compound is stable.

14. The two-part adhesive system of claim 13 wherein the solvent is selected from acetone, methyl ethyl ketone, 1,1,1-trichloroethane, methanol, 1,1,2-trichloro-1,2,2-trifluoroethane and mixtures thereof with each other and with other solvents.

15. The two-part adhesive system of claim 13 wherein the solution of the at least one diazabicyclo or triazabicyclo compound in the solvent has a concentration of 0.001 to 30% weight/volume.

16. The two-part adhesive system of claim 13 wherein the solution of at least one diazabicyclo or triazabicyclo compound in the solvent has a concentration of 0.01 to 2% weight/volume.

17. An adhesion-promoting primer composition for use in bonding non-polar substrates comprising at least one diazabicyclo or triazabicyclo compound selected from;

1,5-diazabicyclo[4.3.0]non-5-ene having the formula:

in a solvent selected from acetone, methyl ethyl ketone, 1,1,1-trichloroethane, methanol, 1,1,2-trichloro-1,2,2-trifluoroethane and mixtures thereof with each other and with other solvents.

18. The primer composition of claim 17 wherein the solvent is an azeotropic mixture of 1,1,2-trichloro-1,2,2-trifluoroethane with acetone.

19. The primer composition of claim 10 wherein the solution of the at least one diazabicyclo or triazabicyclo compound in the solvent has a concentration of 0.001 to 30% weight/volume.

20. The primer composition of claim 17 wherein the solution of the at least one diazabicyclo or triazabicyclo compound in the solvent has a concentration of 0.01 to 2% weight/volume.

* * * * *